(12) United States Patent
Collier et al.

(10) Patent No.: US 11,571,679 B2
(45) Date of Patent: Feb. 7, 2023

(54) PASSIVE $NO_x$ ADSORBER

(71) Applicant: Johnson Matthey Public Limited Company, London (GB)

(72) Inventors: Jillian Elaine Collier, Reading (GB); Sanyuan Yang, Savannah, GA (US)

(73) Assignee: Johnson Matthey Public Limited Company, London (GB)

(*) Notice: Subject to any disclaimer, the term of this patent is extended or adjusted under 35 U.S.C. 154(b) by 283 days.

(21) Appl. No.: 16/565,645

(22) Filed: Sep. 10, 2019

(65) Prior Publication Data
US 2020/0016571 A1 Jan. 16, 2020

Related U.S. Application Data

(63) Continuation of application No. 15/197,818, filed on Jun. 30, 2016, now abandoned.
(Continued)

(51) Int. Cl.
*B01J 20/18* (2006.01)
*B01D 53/94* (2006.01)
(Continued)

(52) U.S. Cl.
CPC .......... *B01J 20/18* (2013.01); *B01D 53/9422* (2013.01); *B01D 53/9431* (2013.01);
(Continued)

(58) Field of Classification Search
CPC . B01J 20/18; B01J 20/02; B01J 29/74; B01D 53/9422; B01D 53/9431; B01D 53/9481; B01D 2255/1023; B01D 2255/50; B01D 2255/9022; B01D 2255/9032; B01D 2255/91
(Continued)

(56) References Cited

U.S. PATENT DOCUMENTS

RE34,804 E    12/1994  Lachman et al.
5,492,883 A    2/1996  Wu
(Continued)

FOREIGN PATENT DOCUMENTS

CN    103619469 A    3/2014
CN    103874541 A    6/2014
(Continued)

*Primary Examiner* — Anita Nassiri-Motlagh

(57) ABSTRACT

A passive $NO_x$ adsorber is disclosed. The passive $NO_x$ adsorber is effective to adsorb $NO_x$ at or below a low temperature and release the adsorbed $NO_x$ at temperatures above the low temperature. The passive $NO_x$ adsorber comprises a noble metal and a molecular sieve having an LTL Framework Type. The invention also includes an exhaust system comprising the passive $NO_x$ adsorber, and a method for treating exhaust gas from an internal combustion engine utilizing the passive $NO_x$ adsorber.

14 Claims, 1 Drawing Sheet

$NO_x$ Storage and Release vs. Time Profiles for Catalyst 1 and Comparative Catalyst 2 – Fresh and Aged

Related U.S. Application Data

(60) Provisional application No. 62/187,866, filed on Jul. 2, 2015.

(51) Int. Cl.

| | | |
|---|---|---|
| *B01J 29/74* | (2006.01) | |
| *B01J 20/02* | (2006.01) | |
| *B01J 35/00* | (2006.01) | |
| *F01N 3/08* | (2006.01) | |
| *B01J 37/04* | (2006.01) | |
| *B01J 37/00* | (2006.01) | |
| *B01J 37/02* | (2006.01) | |
| *B01J 29/87* | (2006.01) | |
| *B01J 29/83* | (2006.01) | |
| *B01J 29/44* | (2006.01) | |
| *F01N 3/10* | (2006.01) | |
| *F01N 3/20* | (2006.01) | |
| *B01J 29/85* | (2006.01) | |
| *B01J 29/80* | (2006.01) | |
| *B01J 35/04* | (2006.01) | |
| *B01J 29/62* | (2006.01) | |
| *F01N 13/00* | (2010.01) | |
| *B01D 53/04* | (2006.01) | |

(52) U.S. Cl.
CPC ..... *B01D 53/9477* (2013.01); *B01D 53/9481* (2013.01); *B01J 20/02* (2013.01); *B01J 29/44* (2013.01); *B01J 29/62* (2013.01); *B01J 29/74* (2013.01); *B01J 29/743* (2013.01); *B01J 29/7415* (2013.01); *B01J 29/80* (2013.01); *B01J 29/83* (2013.01); *B01J 29/85* (2013.01); *B01J 29/87* (2013.01); *B01J 35/0006* (2013.01); *B01J 35/04* (2013.01); *B01J 37/0009* (2013.01); *B01J 37/0244* (2013.01); *B01J 37/0246* (2013.01); *B01J 37/04* (2013.01); *F01N 3/0814* (2013.01); *F01N 3/0842* (2013.01); *F01N 3/101* (2013.01); *F01N 3/2066* (2013.01); *F01N 13/009* (2014.06); *B01D 53/0462* (2013.01); *B01D 53/944* (2013.01); *B01D 53/9418* (2013.01); *B01D 53/9445* (2013.01); *B01D 2253/108* (2013.01); *B01D 2253/25* (2013.01); *B01D 2255/10* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/50* (2013.01); *B01D 2255/9022* (2013.01); *B01D 2255/9032* (2013.01); *B01D 2255/91* (2013.01); *B01D 2255/9155* (2013.01); *B01D 2257/404* (2013.01); *B01J 2229/186* (2013.01); *B01J 2229/36* (2013.01); *F01N 2370/02* (2013.01); *F01N 2370/04* (2013.01); *Y02T 10/12* (2013.01)

(58) Field of Classification Search
USPC ....................................... 423/213.5
See application file for complete search history.

(56) References Cited

U.S. PATENT DOCUMENTS

| | | |
|---|---|---|
| 5,565,394 A | 10/1996 | Lachman et al. |
| 5,633,217 A | 5/1997 | Lynn |
| 5,656,244 A | 8/1997 | Cole |
| 2010/0172828 A1 | 7/2010 | Althoff et al. |
| 2011/0005200 A1 | 1/2011 | Gandhi et al. |
| 2011/0201860 A1 | 8/2011 | Akhtar et al. |
| 2012/0028788 A1* | 2/2012 | Manoylova ............ B01J 29/126 502/1 |
| 2012/0275977 A1 | 11/2012 | Chandler et al. |
| 2012/0308439 A1 | 12/2012 | Chen et al. |
| 2014/0186251 A1* | 7/2014 | Tissler ................ B01J 29/068 502/66 |
| 2014/0234190 A1 | 8/2014 | McKenna |
| 2015/0157982 A1 | 6/2015 | Rajaram et al. |
| 2015/0158019 A1 | 6/2015 | Rajaram et al. |
| 2015/0167570 A1* | 6/2015 | Yasui ................ F02D 41/1475 123/674 |
| 2016/0136626 A1 | 5/2016 | Phillips et al. |

FOREIGN PATENT DOCUMENTS

| | | |
|---|---|---|
| DE | 102011101877 A1 | 5/2015 |
| DE | 102015119913 A1 | 5/2016 |
| EP | 1027919 A1 | 8/2000 |
| JP | H09192486 A | 7/1997 |
| WO | 2004076829 A1 | 9/2004 |
| WO | 2008047170 A1 | 4/2008 |
| WO | 2012166868 A1 | 12/2012 |
| WO | 2013050784 A2 | 4/2013 |
| WO | 2015085305 A1 | 6/2015 |

* cited by examiner

NO$_x$ Storage and Release vs. Time Profiles for Catalyst 1 and Comparative Catalyst 2 – Fresh and Aged
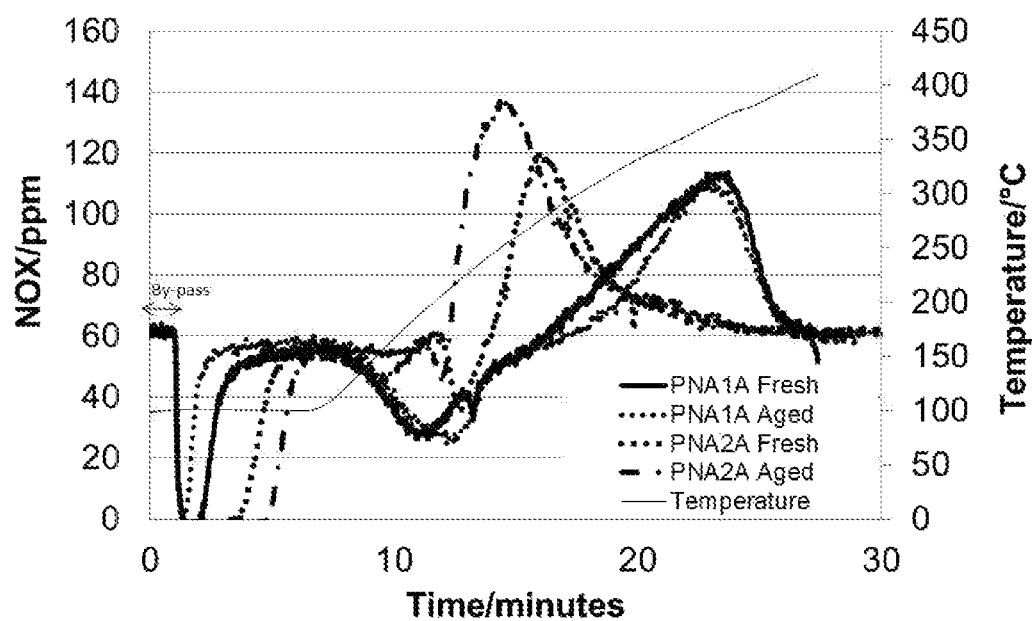

PASSIVE NO$_x$ ADSORBER

FIELD OF THE INVENTION

The invention relates to a passive NO$_x$ adsorber and its use in an exhaust system for internal combustion engines.

BACKGROUND OF THE INVENTION

Internal combustion engines produce exhaust gases containing a variety of pollutants, including nitrogen oxides ("NO$_x$"), carbon monoxide, and uncombusted hydrocarbons. These emissions are the subject of governmental legislation. Emission control systems are widely utilized to reduce the amount of these pollutants emitted to atmosphere, and typically achieve very high efficiencies once they reach their operating temperature (typically, 200° C. and higher). However, these systems are relatively inefficient below their operating temperature (the "cold start" period).

For instance, current urea based selective catalytic reduction (SCR) applications implemented for meeting Euro 6b emissions require that the temperature at the urea dosing position be above about 180° C. before urea can be dosed and used to convert NO$_x$. NO$_x$ conversion below 180° C. is difficult to address using the current systems, and future European and US legislation will stress the low temperature NO$_x$ storage and conversion. Currently this is achieved by heating strategies but this has a detrimental effect of CO$_2$ emissions.

As even more stringent national and regional legislation lowers the amount of pollutants that can be emitted from diesel or gasoline engines, reducing emissions during the cold start period is becoming a major challenge. Thus, methods for reducing the level of NO$_x$ emitted during cold start condition continue to be explored.

For instance, PCT Intl. Appl. WO 2008/047170 discloses a system wherein NO$_x$ from a lean exhaust gas is adsorbed at temperatures below 200° C. and is subsequently thermally desorbed above 200° C. The NO$_x$ adsorbent is taught to consist of palladium and a cerium oxide or a mixed oxide or composite oxide containing cerium and at least one other transition metal.

U.S. Appl. Pub. No. 2011/0005200 teaches a catalyst system that simultaneously removes ammonia and enhances net NO$_x$ conversion by placing an ammonia-selective catalytic reduction ("NH$_3$—SCR") catalyst formulation downstream of a lean NO$_x$ trap. The NH$_3$—SCR catalyst adsorbs the ammonia that is generated during the rich pulses in the lean NO$_x$ trap. The stored ammonia then reacts with the NO$_x$ emitted from the upstream lean NO$_x$ trap, which increases NO$_x$ conversion rate while depleting the stored ammonia.

PCT Intl. Appl. WO 2004/076829 discloses an exhaust-gas purification system which includes a NO$_x$ storage catalyst arranged upstream of an SCR catalyst. The NO$_x$ storage catalyst includes at least one alkali, alkaline earth, or rare earth metal which is coated or activated with at least one platinum group metal (Pt, Pd, Rh, or Ir). A particularly preferred NO$_x$ storage catalyst is taught to include cerium oxide coated with platinum and additionally platinum as an oxidizing catalyst on a support based on aluminum oxide. EP 1027919 discloses a NO$_x$ adsorbent material that comprises a porous support material, such as alumina, zeolite, zirconia, titania, and/or lanthana, and at least 0.1 wt % precious metal (Pt, Pd, and/or Rh). Platinum carried on alumina is exemplified. U.S. Appl. Pub. No. 2012/0308439 A1 teaches a cold start catalyst that comprises (1) a zeolite catalyst comprising a base metal, a noble metal, and a zeolite, and (2) a supported platinum group metal catalyst comprising one or more platinum group metals and one or more inorganic oxide carriers.

U.S. Appl. Pub. No. 2015/0158019 discloses a passive NO$_x$ adsorber (PNA) that comprises a noble metal and a small pore molecular sieve such as chabazite (CHA). Although noble metal/zeolite PNA catalysts such as Pd/CHA and Pd/Beta show good NO$_x$ storage performance and improved sulfur tolerance compared to non-zeolite PNAs, the temperature at which the NO$_x$ is released is too low for the downstream SCR component to convert all of the NO$_x$ to N$_2$.

As with any automotive system and process, it is desirable to attain still further improvements in exhaust gas treatment systems, particularly under cold start conditions. We have discovered a new passive NO$_x$ adsorber that provides enhanced cleaning of the exhaust gases from internal combustion engines. The new passive NO$_x$ adsorber not only increases the NO$_x$ release temperature but also increases the total NO$_x$ storage capacity.

SUMMARY OF THE INVENTION

The invention is a passive NO$_x$ adsorber that is effective to adsorb NO$_x$ at or below a low temperature and release the adsorbed NO$_x$ at temperatures above the low temperature. The passive NO$_x$ adsorber comprises a first noble metal and a molecular sieve having an LTL framework. The invention also includes an exhaust system comprising the passive NO$_x$ adsorber, and a method for treating exhaust gas from an internal combustion engine utilizing the passive NO$_x$ adsorber.

BRIEF DESCRIPTION OF THE DRAWING

FIG. 1 shows the NO$_x$ storage and release vs. time profiles for a PNA of the invention and a comparative PNA in the fresh state and after hydrothermal aging.

DETAILED DESCRIPTION OF THE INVENTION

The passive NO$_x$ adsorber of the invention is effective to adsorb NO$_x$ at or below a low temperature and release the adsorbed NO$_x$ at temperatures above the low temperature. Preferably, the low temperature is about 250° C. The passive NO$_x$ adsorber comprises a first noble metal and a molecular sieve having an LTL Framework Type. The first noble metal is preferably palladium, platinum, rhodium, gold, silver, iridium, ruthenium, osmium, or mixtures thereof; more preferably, palladium, platinum, rhodium, or mixtures thereof. Palladium is particularly preferred.

The molecular sieve has an LTL Framework Type and may be any natural or a synthetic molecular sieve, including zeolites, and is preferably composed of aluminum, silicon, and/or heteroatoms (e.g., Ga) and has an LTL framework. The LTL molecular sieve typically has a three-dimensional arrangement of TO$_4$ (T=Si, Al, Ga) units or tetrahedra that are joined by the sharing of oxygen atoms, and are characterized by a channel system comprising 1-D 12-ring channels. The designation 12-ring refers to the number of tetrahedral atoms (e.g., Si, Al) or oxygen atoms that make up a ring system. Molecular sieve frameworks are typically anionic, which are counterbalanced by charge compensating cations, typically alkali and alkaline earth elements (e.g., Na, K, Mg, Ca, Sr, and Ba), ammonium ions, and also protons. Other metals (e.g., Fe, Ti) may be incorporated into the framework of the LTL molecular sieve to produce a metal-incorporated molecular sieve.

Preferably, the LTL-framework molecular sieve is an aluminosilicate zeolite, an aluminophosphate zeolite, a silicoaluminophosphate (SAPO) zeolite, or other metal-substituted aluminosilicate or aluminophosphate zeolite. More preferably, the LTL-framework molecular sieve is zeolite L, Linde Type L, gallosilicate L, LZ-212, LTL-type SAPO, or perlialite zeolite.

The passive $NO_x$ adsorber may be prepared by any known means. For instance, the first noble metal may be added to the LTL-framework molecular sieve to form the passive $NO_x$ adsorber by any known means, the manner of addition is not considered to be particularly critical. For example, a noble metal compound (such as palladium nitrate) may be supported on the molecular sieve by impregnation, adsorption, ion-exchange, incipient wetness, precipitation, spray drying, or the like. Alternatively, the noble metal may be added during molecular sieve synthesis. Other metals may also be added to the passive $NO_x$ adsorber.

Preferably, the passive $NO_x$ adsorber further comprises a flow-through substrate or filter substrate. The flow-through or filter substrate is a substrate that is capable of containing catalyst components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The passive $NO_x$ adsorber may be added to the flow-through or filter substrate by any known means. A representative process for preparing the passive $NO_x$ adsorber using a washcoat procedure is set forth below. It will be understood that the process below can be varied according to different embodiments of the invention.

The pre-formed passive $NO_x$ adsorber may be added to the flow-through or filter substrate by a washcoating step. Alternatively, the passive $NO_x$ adsorber may be formed on the flow-through or filter substrate by first washcoating unmodified molecular sieve onto the substrate to produce a molecular sieve-coated substrate. Noble metal may then be added to the molecular sieve-coated substrate, which may be accomplished by an impregnation procedure, or the like.

The washcoating procedure is preferably performed by first slurrying finely divided particles of the passive $NO_x$ adsorber (or unmodified LTL-framework molecular sieve) in an appropriate solvent, preferably water, to form the slurry. Additional components, such as transition metal oxides, binders, stabilizers, or promoters may also be incorporated in the slurry as a mixture of water soluble or water-dispersible compounds. If unmodified LTL-framework molecular sieve is utilized in the slurry, a noble metal compound (such as palladium nitrate) may be added into the slurry in order to form the noble metal/LTL-framework molecular sieve during the washcoating process.

The slurry preferably contains between 10 to 70 weight percent solids, more preferably between 20 to 50 weight percent. Prior to forming the slurry, the passive $NO_x$ adsorber (or unmodified LTL-framework molecular sieve) particles are preferably subject to a size reduction treatment (e.g., milling) such that the average particle size of the solid particles is less than 20 microns in diameter.

The flow-through or filter substrate may then be dipped one or more times into the slurry or the slurry may be coated on the substrate such that there will be deposited on the substrate the desired loading of catalytic materials. If the first noble metal is not incorporated into the LTL-framework molecular sieve prior to, or during, washcoating the flow-through or filter substrate, the molecular sieve-coated substrate is typically dried and calcined and then, the first noble metal may be added to the molecular sieve-coated substrate by any known means, including impregnation, adsorption, or ion-exchange, for example, with a noble metal compound (such as palladium nitrate).

The passive $NO_x$ adsorber coating can cover the total length of the substrate, or alternately can only cover a portion of the total length of the substrate such that only an inlet zone or outlet zone of passive $NO_x$ adsorber coating is formed. Preferably, the entire length of the substrate is coated with the passive $NO_x$ adsorber slurry so that a washcoat of the passive $NO_x$ adsorber covers the entire surface of the substrate.

After the flow-through or filter substrate has been coated with the passive $NO_x$ adsorber, and impregnated with noble metal if necessary, the coated substrate is preferably dried and then calcined by heating at an elevated temperature to form the passive $NO_x$ adsorber-coated substrate. Preferably, the calcination occurs at 400 to 600° C. for approximately 1 to 8 hours.

In an alternative embodiment, the flow-through or filter substrate is comprised of the passive $NO_x$ adsorber. In this case, the passive $NO_x$ adsorber is extruded to form the flow-through or filter substrate. The passive $NO_x$ adsorber extruded substrate is preferably a honeycomb flow-through monolith.

Extruded molecular sieve substrates and honeycomb bodies, and processes for making them, are known in the art. See, for example, U.S. Pat. Nos. 5,492,883, 5,565,394, and 5,633,217 and U.S. Pat. No. Re. 34,804. Typically, the molecular sieve material is mixed with a permanent binder such as silicone resin and a temporary binder such as methylcellulose, and the mixture is extruded to form a green honeycomb body, which is then calcined and sintered to form the final small pore molecular sieve flow-through monolith. The molecular sieve may contain the first noble metal prior to extruding such that a passive $NO_x$ adsorber monolith is produced by the extrusion procedure. Alternatively, the first noble metal may be added to a pre-formed molecular sieve monolith in order to produce the passive $NO_x$ adsorber monolith.

Additionally, the passive $NO_x$ adsorber may further comprise a second molecular sieve catalyst. The second molecular sieve catalyst comprises a second noble metal and a second molecular sieve, wherein the second molecular sieve does not have an LTL Framework Type. In this embodiment, the passive $NO_x$ adsorber may comprise one or more additional molecular sieve catalysts (e.g., a third molecular sieve catalyst and/or a fourth molecular sieve catalyst), provided that the additional molecular sieve(s) are different than the first and second molecular sieves.

The first noble metal and the second noble metal are independently selected from platinum, palladium, rhodium, gold, silver, iridium, ruthenium, osmium, or mixtures thereof; preferably, they are independently selected from palladium, platinum, rhodium, or mixtures thereof. More preferably, the first noble metal and the second noble metal are both palladium.

The second molecular sieve is preferably a small pore molecular sieve having the Framework Type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SFW, SIV, THO, TSC, UEI, UFI, VNI, YUG, and ZON, a medium pore molecular sieve having the Framework Type of MFI, FER, MWW, or EUO, a large pore molecular sieve having the Framework Type of CON, BEA, FAU, MAZ, MOR, OFF, or EMT, as well as mixtures or intergrowths of any two or more. More preferably, the small pore zeolite is AEI or CHA, the medium pore zeolite is MFI, and the large pore zeolite is BEA.

The passive $NO_x$ adsorber containing the second molecular sieve catalyst may be prepared by processes well known in the prior art. The noble metal/LTL-framework molecular sieve and the second molecular sieve catalyst may be physically mixed to produce the passive $NO_x$ adsorber. Preferably, the passive $NO_x$ adsorber further comprises a flow-through substrate or filter substrate. In one embodiment, the noble metal/LTL-framework molecular sieve and the second molecular sieve catalyst are coated onto the flow-through or filter substrate, and preferably deposited on the flow-through or filter substrate using a washcoat procedure to produce the passive $NO_x$ adsorber.

Suitable flow-through or filter substrates are described above, as well as procedures for washcoating the substrates with the noble metal/LTL-framework molecular sieve and the second molecular sieve catalyst. The order of addition of the noble metal/LTL-framework molecular sieve and the second molecular sieve catalyst onto the flow-through or filter substrate is not considered critical. Thus, the noble metal/LTL-framework molecular sieve may be washcoated on the substrate prior to the second molecular sieve catalyst or the second molecular sieve catalyst may be washcoated on the substrate prior to the noble metal/LTL-framework molecular sieve or both the noble metal/LTL-framework molecular sieve and the second molecular sieve catalyst can be washcoated on the substrate simultaneously.

In an alternative embodiment, the flow-through or filter substrate is comprised of the noble metal/LTL-framework molecular sieve, the second molecular sieve catalyst, or both the noble metal/LTL-framework molecular sieve and second molecular sieve catalyst. In this case, the noble metal/LTL-framework molecular sieve, the second molecular sieve catalyst, or both are extruded to form the flow-through or filter substrate. If not included in the extruded substrate, the noble metal/LTL-framework molecular sieve or second molecular sieve catalyst is coated onto the extruded flow-through or filter substrate. The extruded substrate is preferably a honeycomb flow-through monolith.

Preferably, the passive $NO_x$ adsorber comprises a first layer comprising the noble metal/LTL-framework molecular sieve and a second layer comprising the second molecular sieve catalyst. Typically, the first layer may be disposed on a substrate and the second layer is disposed on the first layer. Alternatively, the second layer may be disposed on a substrate and the first layer disposed on the second layer.

In a separate embodiment, the passive $NO_x$ adsorber comprises a first zone comprising the noble metal/LTL-framework molecular sieve and a second zone comprising the second molecular sieve catalyst. The first zone may be upstream of the second zone such that the first zone contacts the exhaust gas prior to the second zone, or alternatively the second zone may be upstream of the first zone such that the second zone contacts the exhaust gas prior to the first zone. Preferably, the second zone is located upstream of the first zone such that the exhaust gas contacts the second molecular sieve catalyst prior to contacting the first molecular sieve catalyst. The two zones may be on the same catalyst component (or catalyst brick), or the first zone comprising the noble metal/LTL-framework molecular sieve may be located on a separate brick (or catalyst component) than the second zone comprising the second molecular sieve catalyst.

The invention also includes an exhaust system for internal combustion engines comprising the passive $NO_x$ adsorber. The exhaust system preferably comprises one or more additional after-treatment devices capable of removing pollutants from internal combustion engine exhaust gases at normal operating temperatures. Preferably, the exhaust system comprises the passive $NO_x$ adsorber and one or more other catalyst components selected from: (1) a selective catalytic reduction (SCR) catalyst, (2) a particulate filter, (3) a SCR filter, (4) a $NO_x$ adsorber catalyst, (5) a three-way catalyst, (6) an oxidation catalyst, or any combination thereof. The passive $NO_x$ adsorber is preferably a separate component from any of the above after-treatment devices. Alternatively, the passive $NO_x$ adsorber can be incorporated as a component into any of the above after-treatment devices. That is, the passive $NO_x$ adsorber may be incorporated as a zone on a substrate that contains the other catalyst component; or may be incorporated as a layer on a substrate that contains the other catalyst component. As an illustrative example, the passive $NO_x$ adsorber may be a front zone on a substrate that also contains a diesel oxidation catalyst as the rear zone, (or the passive $NO_x$ adsorber may be a rear zone on a substrate that also contains a diesel oxidation catalyst as the front zone); or the passive $NO_x$ adsorber may be the lower layer on a substrate with a diesel oxidation catalyst forming an overlayer over the lower layer, or the passive $NO_x$ adsorber may be an overlayer covering a lower layer comprising a diesel oxidation catalyst.

So the invention also includes a catalyst comprising a substrate, a diesel oxidation catalyst, and the passive $NO_x$ adsorber. The passive $NO_x$ adsorber is located on a first zone or a first layer on the substrate; and the diesel oxidation catalyst is located on a second zone or a second layer on the substrate. Preferably when the substrate contains a first zone of the passive $NO_x$ adsorber and a second zone of the diesel oxidation catalyst, the first zone is located upstream of the second zone. Alternatively, the first zone is located downstream of the second zone. When the substrate contains a first layer of the passive $NO_x$ adsorber and a second layer of the diesel oxidation catalyst, the first layer is preferably disposed on the substrate and the second layer is disposed on the first layer. Alternatively, the second layer is disposed on the substrate and the first layer is disposed on the second layer.

These after-treatment devices are well known in the art. Selective catalytic reduction (SCR) catalysts are catalysts that reduce $NO_x$ to $N_2$ by reaction with nitrogen compounds (such as ammonia or urea) or hydrocarbons (lean $NO_x$ reduction). A typical SCR catalyst is comprised of a vanadia-titania catalyst, a vanadia-tungsta-titania catalyst, or a metal/zeolite catalyst such as iron/beta zeolite, copper/beta zeolite, copper/SSZ-13, copper/SAPO-34, Fe/ZSM-5, or copper/ZSM-5.

Particulate filters are devices that reduce particulates from the exhaust of internal combustion engines. Particulate filters include catalyzed particulate filters and bare (non-catalyzed) particulate filters. Catalyzed particulate filters (for diesel and gasoline applications) include metal and metal oxide components (such as Pt, Pd, Fe, Mn, Cu, and ceria) to oxidize hydrocarbons and carbon monoxide in addition to destroying soot trapped by the filter.

Selective catalytic reduction filters (SCRF) are single-substrate devices that combine the functionality of an SCR and a particulate filter. They are used to reduce $NO_x$ and particulate emissions from internal combustion engines. In addition to the SCR catalyst coating, the particulate filter may also include other metal and metal oxide components (such as Pt, Pd, Fe, Mn, Cu, and ceria) to oxidize hydrocarbons and carbon monoxide in addition to destroying soot trapped by the filter.

$NO_x$ adsorber catalysts (NACs) are designed to adsorb $NO_x$ under lean exhaust conditions, release the adsorbed $NO_x$ under rich conditions, and reduce the released $NO_x$ to form $N_2$. NACs typically include a $NO_x$-storage component (e.g., Ba, Ca, Sr, Mg, K, Na, Li, Cs, La, Y, Pr, and Nd), an oxidation component (preferably Pt) and a reduction component (preferably Rh). These components are contained on one or more supports.

Three-way catalysts (TWCs) are typically used in gasoline engines under stoichiometric conditions in order to convert $NO_x$ to $N_2$, carbon monoxide to $CO_2$, and hydrocarbons to $CO_2$ and $H_2O$ on a single device.

Oxidation catalysts, and in particular diesel oxidation catalysts (DOCs), are well-known in the art. Oxidation catalysts are designed to oxidize CO to $CO_2$ and gas phase hydrocarbons (HC) and an organic fraction of diesel particulates (soluble organic fraction) to $CO_2$ and $H_2O$. Typical oxidation catalysts include platinum and optionally also palladium on a high surface area inorganic oxide support, such as alumina, silica-alumina and a zeolite.

The passive $NO_x$ adsorber is preferably a separate component from any of the above after-treatment devices. Alternatively, the passive $NO_x$ adsorber can be incorporated as a component into any of the above after-treatment devices. For instance, a substrate may comprise and upstream zone of the passive $NO_x$ adsorber and a downstream zone of SCR catalyst on the same substrate.

The exhaust system can be configured so that the passive $NO_x$ adsorber is located close to the engine and the additional after-treatment device(s) are located downstream of the passive $NO_x$ adsorber. Thus, under normal operating conditions, engine exhaust gas first flows through the passive $NO_x$ adsorber prior to contacting the after-treatment device(s). Alternatively, the exhaust system may contain valves or other gas-directing means such that during the low temperature period (below a temperature ranging from about 150 to 220° C., preferably 200° C., about as measured at the after-treatment device(s)), the exhaust gas is directed to contact the after-treatment device(s) before flowing to the passive $NO_x$ adsorber. Once the after-treatment device(s) reaches the operating temperature (about 150 to 220° C., preferably 200° C., as measured at the after-treatment device(s)), the exhaust gas flow is then redirected to contact the passive $NO_x$ adsorber prior to contacting the after-treatment device(s). This ensures that the temperature of the passive $NO_x$ adsorber remains low for a longer period of time, and thus improves efficiency of the passive $NO_x$ adsorber, while simultaneously allowing the after-treatment device(s) to more quickly reach operating temperature. U.S. Pat. No. 5,656,244, the teachings of which are incorporated herein by reference, for example, teaches means for controlling the flow of the exhaust gas during cold-start and normal operating conditions.

The invention also includes a method for treating exhaust gas from an internal combustion engine. The method comprises adsorbing $NO_x$ onto the passive $NO_x$ adsorber at temperatures at or below a low temperature, thermally desorbing $NO_x$ from the passive $NO_x$ adsorber at a temperature above the low temperature, and catalytically removing the desorbed $NO_x$ on a catalyst component downstream of the passive $NO_x$ adsorber. Preferably, the low temperature is about 250° C.

The catalyst component downstream of the passive $NO_x$ adsorber is a SCR catalyst, a particulate filter, a SCR filter, a $NO_x$ adsorber catalyst, a three-way catalyst, an oxidation catalyst, or combinations thereof.

The following examples merely illustrate the invention. Those skilled in the art will recognize many variations that are within the spirit of the invention and scope of the claims.

Example 1: Preparation of Passive $NO_x$ Adsorbers (PNAs)

PNA 1A:
1 wt. % Pd/LTL

Palladium is added to LTL zeolite (crystalline structure; silica-to-alumina ratio (SAR) of about 6; $NH_4^+$ exchanged) according to the following procedure to produce PNA 1A: The powder catalyst is prepared by wet impregnation of the zeolite using a soluble palladium compound as the precursor. After drying at 105° C., the sample is calcined at 500° C. to provide the fresh catalyst, and a portion of the fresh catalyst is then hydrothermally aged at 750° C. in an air atmosphere containing 10% $H_2O$. The Pd loading of PNA 1A is 1 wt. %.

PNA 1B:
3 wt. % Pd/LTL

PNA 1B is produced using the same procedure as PNA 1A with the exception that a higher amount of palladium is loaded onto the LTL zeolite. The Pd loading of PNA 1B is 3 wt. %.

Comparative PNA 2A:
1 wt. % Pd/CHA

Comparative PNA 2A is produced using the same procedure as PNA 1A with the exception that a small pore chabazite (CHA) zeolite with a silica-to-alumina ratio (SAR) of 25 is used in place of LTL. The Pd loading of Comparative PNA 2A is 1 wt. %.

Comparative PNA 2B:
3 wt. % Pd/CHA Comparative PNA 2B is produced using the same procedure as PNA 1B with the exception that a small pore chabazite (CHA) zeolite with a silica-to-alumina ratio (SAR) of 25 is used in place of LTL. The Pd loading of Comparative PNA 2B is 3 wt. %.

Example 2: $NO_x$ Storage Capacity Testing Procedures

The catalyst (0.4 g) is held at the adsorption temperature of about 100° C. for 5 minutes in an NO-containing gas mixture flowing at 2 liters per minute at a MHSV of 300 $L*hr^{-1}*g^{-1}$. This adsorption stage is followed by Temperature Programmed Desorption (TPD) at a ramping rate of 17° C./minute in the presence of the NO-containing gas until the bed temperature reaches about 450° C. in order to purge the catalyst of all stored $NO_x$ for further testing.

The NO-containing gas mixture during both the adsorption and desorption comprises 10 vol. % $O_2$, 60 ppm $NO_x$ 5 vol. % $CO_2$, 1500 ppm CO, 130 ppm $C_3H_6$, and 5 vol. % $H_2O$ in $N_2$.

The $NO_x$ storage is calculated as the amount of $NO_2$ stored per liter of catalyst with reference to a monolith containing a catalyst loading of about 3 $g/in^3$. The results are shown in Table 1 and the $NO_x$ uptake and release profiles are shown in FIG. 1 for fresh and aged catalysts (hydrothermally aged at 750° C. as described in Example 1).

The results at Table 1 show that the PNAs of the invention (PNA 1A and PNA 1B) store a greater amount of $NO_x$ compared to the Comparative PNAs over the entire testing period in the fresh state and clearly demonstrate the higher $NO_x$ release temperatures for Pd/LTL, both fresh and aged compared to the corresponding Pd/CHA comparative catalysts. Although at the initial 100° C. storage period the $NO_x$ storage of the Pd/CHA samples was higher than that of the Pd/LTL samples, during the temperature ramping period above 100° C. the Pd/LTL samples store more $NO_x$ than the comparative Pd/CHA samples as shown in FIG. 1. FIG. 1 also shows the $NO_x$ thermally releasing at higher temperatures than the comparative Pd/CHA examples (~370° C. vs ~260° C.) and that the $NO_x$ release characteristics are maintained upon hydrothermal aging.

TABLE 1

$NO_x$ Storage Comparison Results

| Catalyst | Zeolite | Pd loading | $NO_x$ storage capacity until breakthrough [1] (g $NO_2$/L) | $NO_x$ release onset temperature (° C.) | $NO_x$ release peak temperature (° C.) |
|---|---|---|---|---|---|
| 1A Fresh | LTL | 1 wt % | 0.55 | 285 | 370 |
| 2A Fresh * | CHA | 1 wt % | 0.51 | 230 | 260 |
| 1B Fresh | LTL | 3 wt % | 1.48 | 295 | 360 |
| 2B Fresh * | CHA | 3 wt % | 0.7 | 260 | 330 |
| 1A Aged | LTL | 1 wt % | 0.39 | 300 | 365 |
| 2A Aged * | CHA | 1 wt % | 0.64 | 220 | 255 |

[1] "Breakthrough" is defined as the temperature at which the concentration of $NO_x$ in the gas stream rises above the initial inlet value of 60 ppm.

We claim:

1. An exhaust system for internal combustion engines comprising a passive $NO_x$ adsorber and at least one additional after-treatment device(s) selected from the group consisting a selective catalytic reduction (SCR) catalyst, a particulate filter, a SCR filter, a $NO_x$ adsorber catalyst, a three-way catalyst, an oxidation catalyst, and combinations thereof; wherein the passive $NO_x$ adsorber is effective to adsorb $NO_x$ at or below a low temperature and release the adsorbed $NO_x$ at temperatures above the low temperature, said passive $NO_x$ adsorber comprises a first molecular sieve catalyst, said first molecular sieve catalyst consisting of a first noble metal and a molecular sieve having an LTL Framework Type and having a silica-to-alumina ratio (SAR) of about 6; wherein the first noble metal is palladium.

2. The exhaust system of claim 1 wherein the molecular sieve having an LTL Framework Type is selected from the group consisting of aluminosilicate zeolite, an aluminophosphate zeolite, a silicoaluminophosphate (SAPO) zeolite, and a metal-substituted aluminosilicate or aluminophosphate zeolite.

3. The exhaust system of claim 1 wherein the molecular sieve having an LTL Framework Type is selected from the group consisting of zeolite L, Linde Type L, gallosilicate L, LZ-212, LTL-type SAPO, and perlialite zeolite.

4. The exhaust system of claim 1 wherein the passive $NO_x$ adsorber is coated onto a flow-through or filter substrate.

5. The exhaust system of claim 1 wherein the passive $NO_x$ adsorber is extruded to form a flow-through or filter substrate.

6. The exhaust system of claim 1, wherein the passive $NO_x$ adsorber further comprises a second molecular sieve catalyst, wherein the second molecular sieve catalyst comprises a second noble metal and a second molecular sieve, wherein the second molecular sieve does not have an LTL Framework Type.

7. The exhaust system of claim 6 wherein the second noble metal is independently selected from the group consisting of platinum, palladium, rhodium, gold, silver, iridium, ruthenium, osmium, and mixtures thereof.

8. The exhaust system of claim 6 wherein the first noble metal and the second noble metal are both palladium.

9. The exhaust system of claim 6 wherein the second molecular sieve is a small, medium or large pore molecular sieve selected from the group of Framework Type consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MAZ, MER, MON, NSI, OFF, OWE, PAU, PHI, RHO, RTH, SAT, SAV, SFW, SIV, THO, TSC, UEI, UFI, VNI, YUG, ZON, BEA, and MFI, and intergrowths of two or more.

10. The exhaust system of claim 9 wherein the small pore molecular sieve is selected from the group Framework Type consisting of AEI and CHA.

11. The exhaust system of claim 6 wherein the passive $NO_x$ adsorber is coated onto a flow-through or filter substrate.

12. The exhaust system of claim 6, wherein the passive $NO_x$ adsorber has a first layer and a second layer wherein the first layer comprises the first noble metal and the molecular sieve having an LTL Framework Type and the second layer comprises the second molecular sieve catalyst.

13. The exhaust system of claim 6, wherein the passive $NO_x$ adsorber has a first zone and a second zone wherein the first zone comprises the first noble metal and the molecular sieve having an LTL Framework Type and the second zone comprises the second molecular sieve catalyst.

14. The exhaust system of claim 1 wherein the low temperature is 250° C.

* * * * *